3,367,949
SULFANILAMIDES
Quentin F. Soper, Indianapolis, Ind., assignor to Eli Lilly and Company, Indianapolis, Ind., a corporation of Indiana
No Drawing. Filed Aug. 22, 1966, Ser. No. 573,829
6 Claims. (Cl. 260—397.7)

This invention relates to novel organic compounds having broad though selective herbicidal activity and to novel herbicidal compositions and processes employing these compounds. More particularly, this invention concerns novel substituted sulfanilamides as the herbicidally active novel compounds.

It is an object of this invention to provide compounds which are toxic to both grasses and broadleaf weeds in their germinating stage but which are nontoxic to crop plants. It is a further object of this invention to provide novel compositions and processes which can eliminate weed grasses and certain broadleaf weeds selectively from crop plants such as corn, cotton, and soybeans and their close relatives in the plant kingdom.

In fulfillment of the above and other objects this invention provides novel compounds and compositions for inhibiting the growth of weed grasses and of broadleaf weeds. The novel compounds are of the formula:

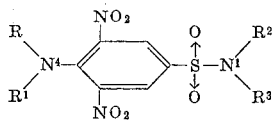

wherein R, when taken separately, in hydrogen, $C_3$–$C_4$ alkenyl, or $C_3$–$C_6$ alkyl;

$R^1$, when taken separately, is $C_3$–$C_4$ alkenyl, or $C_3$–$C_6$ alkyl;

R and $R^1$, when neither is hydrogen, contain a total of from 4 to 8 carbons;

R and $R^1$, when taken together with the nitrogen atom to which they are attached, form a pyrrolidino, piperidino, or morpholino ring;

$R^2$ and $R^3$, when taken together with the nitrogen atom to which they are attached, for a pyrrolidino or aziridino ring;

$R^2$ and $R^3$, when taken separately, are the same or different and are hydrogen, $C_1$–$C_5$ alkyl, allyl, phenyl, or $C_3$–$C_5$ cycloalkyl;

when $R^2$ is hydrogen, $R^3$ contains less than 7 carbons; and $R^2$ and $R^3$, when neither is hydrogen, contain a total of not more than 4 carbon atoms.

In the above groups, $C_1$–$C_5$ alkyl can be illustratively methyl, ethyl, n-propyl, isopropyl, n-butyl, sec.-butyl, isobutyl, n-amyl, isoamyl, sec.-amyl, or the like.

$C_3$–$C_6$ alkyl can be illustratively n-propyl, isopropyl, n-butyl, isobutyl, sec.-butyl, n-amyl, isoamyl, n-hexyl, isohexyl, or the like.

$C_3$–$C_5$ cycloalkyl can be illustratively cyclopropyl, cyclobutyl, or cyclopentyl.

$C_3$–$C_4$ alkenyl can be illustratively allyl, methallyl, or crotyl.

As examples of compounds which have the desired herbicidal activity and which can be successively employed as weed-killing agents in accordance with the processes of this invention, there may be mentioned 3,5-dinitro-$N^4$,$N^4$-di(n-propyl)sulfanilamide;
$N^1$-methyl-3,5-dinitro-$N^4$,$N^4$-di(n-propyl)sulfanilamide;
$N^1$,$N^1$-dimethyl-3,5-dinitro-$N^4$,$N^4$-di(n-propyl)sulfanilamide;
$N^1$-allyl-3,5-dinitro-$N^4$,$N^4$-di(n-propyl)sulfanilamide;
3,5-dinitro-$N^1$,$N^4$,$N^4$-tri(n-propyl)sulfanilamide;
$N^1$-ethyl-3,5-dinitro-$N^4$,$N^4$-(di-n-propyl)sulfanilamide;
$N^1$-cyclopropyl-3,5-dinitro-$N^4$,$N^4$-di(n-propyl)sulfanilamide;
$N^1$-ethyl-$N^1$-methyl-3,5-dinitro-$N^4$,$N^4$-di(n-propyl)sulfanilamide;
$N^4$-(1-ethylpropyl)-$N^4$-methyl-3,5-dinitrosulfanilamide;
$N^4$-(1-ethylpropyl)-$N^1$,$N^1$-dimethyl-3,5-dinitrosulfanilamide;
$N^4$-(1-ethylpropyl)-3,5-dinitrosulfanilamide;
$N^1$,$N^1$-diethyl-3,5-dinitro-$N^4$,$N^4$-di(n-propyl)sulfanilamide;
4-(aziridinosulfonyl)-2,6-dinitro-N,N-di(n-propyl)aniline;
and the like.

Compounds possessing the above structures preferably are formulated for use as pre-emergent selective herbicides either as dusts, spray concentrates, spreadable granules, or wettable powders. Although the compounds are soluble in aqueous 10 percent sodium or potassium hydroxide, they are quite insoluble in water. For the preparation of emulsion-type sprays or wettable powders, the compounds desirably are formulated with a wetting agent or surfactant, polyoxyethylenesorbitan monolaurate, polyoxyethylenesorbitan mono-oleate, polyoxyglycol ethersulfonate, alkylaminododecylbenzene sulfonate or the like. In the preparation of spreadable granules, the inert diluent used may be calcite or attapulgite clay.

The novel processes of this invention comprise treating a soil area or locus infested with weed grass seeds and broadleaf weed seeds with a dust, granular formulation, or spray containing a compound coming within the scope of the above formula as the herbicidally active ingredient. Typical soil areas which can be treated include crop-growing areas in which crops other than grasses will be grown; e.g., flower beds, strawberry patches, and similar areas of cultivation. Compositions containing the herbicidally active compounds are sprayed, dusted, or spread by other methods well known by the art onto the crop areas at the rate of around 0.1 to 8.0 pounds per acre or somewhat more if necessary, for example 0.5 pound of active ingredient per acre. For most field applications, we prefer to spray or dust the herbicidal compositions of this invention at the rate of about 0.5 to 4 pounds of active ingredient per acre. If, however, the herbicidal compositions are spread in a granular form over the areas to be treated, we prefer to employ a greater amount of active material per acre, suitably in the range of about 1 to about 8 pounds of an active sulfonamide.

The novel compositions of the present invention possess the surprising and wholly unexpected ability to control certain undesirable plants unaffected by previously known weed control agents. These include Jimsonweed (*Datura stramonium*); common ragweed (*Ambrosia artemisiifolia*); Venice mallow (*Hibiscus trionum*); and Velvet leaf (*Abutilon theophrasti*).

In addition seedlings and germinating seeds of many other varieties of weeds are killed by the above treatment process, including such undesirable grasses as the crabgrasses (*Digitaria sanguinalis*, and *Digitaria ischaemum*); green and yellow foxtails (*Setaria viridis* and *Setaria lutescens*); and broadleaf weeds such as pigweed (*Amaranthus retroflexus*).

When sprays or dusts containing a substituted sulfonamide as represented by the above formula are applied at the rate of about 0.5 pound of herbicidal compound per acre to flats planted to crops, for example, soybeans, and infested with foxtail seeds, crabgrass seeds, and Velvet leaf seeds, germination of these weed species is completely inhibited without harm to the crop. In fact, application rates from as low as 0.125 pound per acre to as high as 8 pounds per acre have been shown to effectuate control of these undesirable weeds.

In addition to eliminating crabgrass, foxtail, and pigweed, the present novel compounds control ragweed, Velvet leaf, Jimsonweed, and Venice mallow in crop lands.

The herbicidal compositions of this invention can be employed in other useful ways. For example, spray or dust compositions as provided by this invention can be used to eradicate crabgrass, Velvet leaf, Jimsonweed, and the other undesirable weeds from perennial flower beds or to destroy germinating seeds of an undesired grass in turf. Other methods of employing the selective herbicidal compositions of this invention will be readily apparent to those skilled in the art.

The novel compounds coming within the scope of this invention are prepared by reaction of an appropriately substituted benzenesulfonyl halide with ammonium hydroxide, or a primary amine or a secondary amine, to yield the corresponding benzenesulfonamide, unsubstituted, monosubstituted, or disubstituted on the sulfonamide nitrogen atom, respectively.

For example, a mixture of 3,5-dinitro-4-[di(n-propyl)-amino]benzenesulfonyl chloride and an excess of concentrated ammonium hydroxide, the excess acting as solvent, is heated to reflux temperature for several hours. The reaction product mixture is cooled, poured onto crushed ice, and filtered. The filtrate is concentrated to dryness in vacuo and recrystallized from a mixture of acetone and petroleum ether to yield 3,5-dinitro-$N^4,N^4$-di(n-propyl)-sulfanilamide as a solid, having a melting point of about 137–138° C.

Other of the novel compounds can be prepared by allowing a 4-halobenzenesulfonamide to react at reflux temperature with an appropriate secondary amine in the presence of triethylamine, to take up the halo acid formed in the reaction to yield the $N^4,N^4$-dialkylaminobenzenesulfonamide. This method of preparation of the novel compounds is illustrated as follows: A mixture of 4-chloro-3,5-dinitro-$N^4,N^4$-dimethylbenzenesulfonamide, di(n-propyl)amine and triethylamine is refluxed for several hours and worked up as described, supra, to yield $N^1,N^1$-dimethyl-3,5-dinitro-$N^4,N^4$-di(n-propyl)sulfanilamide as a solid having a melting point of about 137° C.

*Example 1.—3,5-dinitro-$N^4,N^4$-di(n-propyl)sulfanilamide*

A mixture of 5 gm. of 3,5-dinitro-4-[di(n-propyl)-amino]benzenesulfonyl chloride and 3.5 gm. of concentrated ammonium hydroxide solution was heated to refluxing for about three hours. The reaction product mixture was cooled and poured into 200 ml. of ether. The mixture was filtered, concentrated in vacuo to dryness and the residue recrystallized from a mixture of acetone and petroleum ether to yield 3,5-dinitro-$N^4,N^4$-di(n-propyl)sulfanilamide as a solid having a melting point of about 137–138° C.

*Analysis.*—Calcd.: N, 16.18. Found: N, 16.24.

Following the general procedure of Example 1 and using appropriate amines the following compounds were prepared:

$N^1$-methyl-3,5-dinitro-$N^4,N^4$-di(n-propyl)sulfanilamide, 3,5-dinitro-4-[di(n-propyl)amino]benzenesulfonyl chloride and methylamine. Melting point: 145–146° C.

*Analysis.*—Calcd.: N, 15.55. Found: N, 14.65.

$N^4$-(1-ethylpropyl)-$N^1$-methyl-3,5-dinitrosulfanilamide, from 3,5-dinitro-4-[1-(ethylpropyl)amino] benzenesulfonyl chloride and methylamine. Melting point: 57–60° C.

*Analysis.*—Calcd.: C, 41.60; H, 5.24; N, 16.18. Found: C, 41.88; H, 5.72; N, 15.34.

$N^4$-(1-ethylpropyl)-$N^1,N^1$-dimethyl-3,5-dinitrosulfanilamide, from 3,5-dinitro-4-[1-(ethylpropyl)amino]benzenesulfonyl chloride and dimethylamine. Melting point: 119–120° C.

*Analysis.*—Calcd.: C, 43.32; H, 5.59; N, 15.55. Found: C, 42.69; H, 5.85; N, 14.55.

3,5-dinitro-4-(N-piperidino)benzenesulfonamide, from 3,5-dinitro-4-(N-piperidino)benzenesulfonyl chloride and concentrated ammonium hydroxide. Melting point: 224–226° C.

*Analysis.*—Calcd.: C, 39.99; H, 4.27; N, 16.96. Found: C, 40.10; H, 4.65; N, 16.77.

$N^1$-methyl-3,5-dinitro-4-(N-piperidino)benzenesulfonamide, from 3,5-dinitro-4-(N-piperidino)benzenesulfonyl chloride and methylamine. Melting point: 145–146° C.

*Analysis.*—Calcd.: C, 41.85; H, 4.68; N, 16.27. Found: C, 41.91; H, 4.92; N, 16.46.

$N^1,N^1$-dimethyl-3,5-dinitro-4-(N-piperidino)benzenesulfonamide from 3,5-dinitro-4-(N-piperidino)benzenesulfonyl chloride and dimethylamine. Melting point: 138–139° C.

*Analysis.*—Calcd.: C, 43.57; H, 5.06; N, 15.63. Found: C, 43.98; H, 4.57; N, 14.81.

*Example 2.—$N^1,N^1$-dimethyl-3,5-dinitro-$N^4,N^4$-di(n-propyl)sulfanilamide*

A mixture of 3 g. of 4-chloro-3,5-dinitro-N,N-dimethylbenzenesulfonamide, 1.5 g. of di(n-propyl)amine, and 1.5 g. of triethylamine was refluxed for about three hours. The reaction product mixture was worked up as described in Example 1 to yield $N^1,N^1$-dimethyl-3,5-dinitro-$N^4,N^4$-di(n-propyl)sulfanilamide as a solid having a melting point of about 137° C. Yield: 1.5 g.

*Analysis.*—Calcd.: C, 44.91; H, 5.92; N, 14.96. Found: C, 44.54; H, 6.25; N, 14.32.

I claim:

1. A compound of the formula:

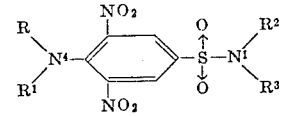

wherein

R, when taken separately, is hydrogen, $C_3$–$C_4$ alkenyl, or $C_3$–$C_6$ alkyl;

$R^1$, when taken separately, is $C_3$–$C_4$ alkenyl or $C_3$–$C_6$ alkyl;

R and $R^1$, when both are selected from the group consisting of $C_3$–$C_4$ alkenyl and $C_3$–$C_6$ alkyl, contain a total of from 4 to 8 carbons;

R and $R^1$, when taken together with the nitrogen atom to which they are attached, form a pyrrolidino, piperidino, or morpholino ring;

$R^2$ and $R^3$, when taken together with the nitrogen atom to which they are attached, form a pyrrolidino or aziridino ring;

$R^2$ and $R^3$, when taken separately, are the same or different, and are hydrogen, $C_1$–$C_5$ alkyl, allyl, phenyl, or $C_3$–$C_5$ cycloalkyl;

When $R^2$ is hydrogen, $R^3$ contains less than 7 carbons; and $R^2$ and $R^3$, when neither is hydrogen, contain a total of not more than 4 carbon atoms.

2. A compound as in claim 1, said compound being 3,5-dinitro-$N^4,N^4$-di(n-propyl)sulfanilamide.

3. A compound as in claim 1, said compound being $N^1$-methyl-3,5-dinitro-$N^4,N^4$-di(n-propyl)sulfanilamide.

4. A compound as in claim 1, said compound being $N^1,N^1$-dimethyl-3,5-dinitro-$N^4,N^4$-di(n-propyl)sulfanilamide.

5. A compound as in claim 1, said compound being $N^1$-allyl-3,5-dinitro-$N^4,N^4$-di(n-propyl)sulfanilamide.

6. A compound as in claim 1, said compound being 3,5-dinitro-$N^1,N^4,N^4$-tri-(n-propyl)sulfanilamide.

(References on following page)

References Cited

UNITED STATES PATENTS

| | | | |
|---|---|---|---|
| 2,169,971 | 8/1939 | Behnisch et al. | 260—397.7 X |
| 2,231,021 | 2/1941 | McNally et al. | 260—397.7 X |
| 2,261,175 | 11/1941 | McNally et al. | 260—397.7 X |
| 2,358,465 | 9/1944 | McNally et al. | 260—397.7 X |

OTHER REFERENCES

Hoover et al., J. Am. Chem. Soc., vol. 77, pp. 5652 to 5655 (1955).

JOHN D. RANDOLPH, *Primary Examiner.*